(12) United States Patent
Umegård

(10) Patent No.: US 7,296,536 B2
(45) Date of Patent: Nov. 20, 2007

(54) METHOD AND ARRANGEMENT FOR AUTOMATICALLY VERIFYING IDENTITIES OF MILK PRODUCING ANIMALS

(75) Inventor: Anders Umegård, Rönninge (SE)

(73) Assignee: DeLaval Holding AB, Tumba (SE)

( * ) Notice: Subject to any disclaimer, the term of this patent is extended or adjusted under 35 U.S.C. 154(b) by 211 days.

(21) Appl. No.: 10/518,552

(22) PCT Filed: Jul. 11, 2003

(86) PCT No.: PCT/SE03/01204

§ 371 (c)(1),
(2), (4) Date: Dec. 22, 2004

(87) PCT Pub. No.: WO2004/008844

PCT Pub. Date: Jan. 29, 2004

(65) Prior Publication Data

US 2005/0223997 A1    Oct. 13, 2005

(30) Foreign Application Priority Data

Jul. 19, 2002    (SE) ..................... 0202285

(51) Int. Cl.
*A01J 3/00* (2006.01)

(52) U.S. Cl. .................. 119/14.03
(58) Field of Classification Search ............. 119/14.02, 119/14.03, 416, 14.08, 14.14, 340, 573.3, 119/840, 721, 14.18; 340/573.3
See application file for complete search history.

(56) References Cited

U.S. PATENT DOCUMENTS

| | | | |
|---|---|---|---|
| 4,798,175 A | 1/1989 | Townsend et al. | |
| 5,028,918 A | 7/1991 | Giles et al. | |
| 5,183,008 A | 2/1993 | Carrano | |
| 5,653,192 A | 8/1997 | Sheen et al. | |
| 5,959,526 A | 9/1999 | Tucker | |
| 6,019,061 A * | 2/2000 | Schulte | 119/14.03 |
| 6,427,627 B1* | 8/2002 | Huisma | 119/51.02 |
| 6,516,744 B1* | 2/2003 | Bjork et al. | 119/14.02 |
| 6,571,730 B1* | 6/2003 | Norberg | 119/14.03 |
| 2001/0042515 A1* | 11/2001 | Gallagher et al. | 119/14.03 |
| 2005/0223998 A1* | 10/2005 | Bosma et al. | 119/14.18 |

FOREIGN PATENT DOCUMENTS

| | | |
|---|---|---|
| EP | 0 624 313 A1 | 11/1994 |
| EP | 1 169 917 A1 | 1/2002 |

* cited by examiner

*Primary Examiner*—Yvonne R. Abbott
(74) *Attorney, Agent, or Firm*—Birch, Stewart, Kolasch & Birch, LLP

(57) ABSTRACT

A milking parlor (10) comprises a row of stalls (14) accessible to milk producing animals (12) from a front end (14a) thereof, and adapted for milking the animals; and an identification station (20) arranged in the front end for identifying the animals when entering the parlor. A method of verifying the identities of the animals in the row comprises: (i) identifying the animals in the stall located at the far end (14b) of the row, in the stall located at the front end (14a) of the row, and in a stall located there in between by first, second and third identification members (24, 26, 28); (ii) comparing the identifications of the first, second, and third identification members (24, 26, 28) with the first, last and n'th identifications from the identification station (20), where the stall located between the far and front ends is the n'th stall as counted from the far end (14b); and (iii) depending on the comparison verifying the identities of at least some of the animals (12) in the row (14).

19 Claims, 5 Drawing Sheets

METHOD AND ARRANGEMENT FOR AUTOMATICALLY VERIFYING IDENTITIES OF MILK PRODUCING ANIMALS

TECHNICAL FIELD OF THE INVENTION

The present invention generally relates to the field of dairy farming and more specifically the invention relates to methods and arrangements for automatically verifying identities of milk producing animals in a milking parlor comprising a row of stalls.

DESCRIPTION OF RELATED ART AND BACKGROUND OF THE INVENTION

Milking parlors with automatic cow identification systems are known in the prior art, see for example U.S. Pat. No. 5,653,192 issued to Sheen et al. and U.S. Pat. No. 5,183,008 issued to Townsend et al.

The parlor typically has an identification sensor at the entrance, which sensor includes a transmitter antenna and a receiver antenna for communicating with a transponder in an identification tag on a collar around the neck of a cow. The transponder in the identification tag includes an electronic oscillator circuit triggered by interrogating electromagnetic RF radiation from the transmitter antenna and sends back a coded identifying signal in response to the interrogating pulse, which signal is received by the receiver antenna. The coded identifying signal is an individual unique identification code identifying that particular cow.

The cows initially enter the parlor while passing serially through an entrance having the above-mentioned identification antenna system, and enter then into plural parallel milking stalls, with the first cow entering the stall in the far end of the parlor, the second cow entering the adjacent stall, etc., and the last cow entering the stall closest to the entrance.

The identification system correlates the cow passing through the identification antenna system with the stall receiving such cow. In this manner, it should be known which cows are in the respective stalls, and in turn milk production can be correlated and tracked for each cow.

A problem arises, however, when a cow passing through the entrance antenna system has lost her tag or has a malfunctioning tag, in which case there is no response signal sent back to the identification antenna system and hence no cow identified. One stall thus has an unidentified cow therein, and the computerized identification system will believe that the next cow is at such stall location.

For example, if the second cow to pass serially through the entrance has a missing tag, such cow will enter the second stall as counted from the far end of the milking parlor. However, the computerized identification system will register a second response coded signal firstly from the third cow, and hence will correlate the third cow to the second stall, i.e. the computerized identification system does not identify the second cow. Likewise, all following cows will be misidentified by one stall location, i.e. correlated to incorrect stalls.

In very small dairy farms, the above problem may not be a significant drawback because the farmers are familiar with the cows and can correct missed identifications manually. However, in large parlors, a misidentification can become a significant problem, particularly when the farmers do not know the cows well enough to correct errors manually.

In addition to absent or malfunctioning tags, misidentifications may be caused when a cow enters with her tag in an unreadable position, or may be due to electronic noise interference, etc. Even if the error or misidentification rate is low, e.g. less than 0.5%, a significant problem can arise depending upon where such error occurs in the serial flow of cows through the entrance.

For example, if one of the last cows serially entering the parlor has a missing tag, then only the few cows thereafter will also be misidentified. However, if one of the first cows serially entering the parlor has a missing tag, then each of the cows thereafter will be correlated to an incorrect stall.

For a parlor with 20 stalls in a row serving about 1000 cows and with a correct identification probability for each cow entered of 99.5%, the probability that at least one cow in a row of 20 cows is misidentified is $1-0.995^{20} \approx 10\%$, which corresponds to about 5 of the 50 subsequent milking sessions to be performed to complete the milking of the 1000 cows. In average a misidentified cow will lead to 10 misidentifications (20/2) since all cows entered after the misidentified cow will also be misidentified. Hence, in average 50 (5*10) of the 1000 cows, or 5%, will be misidentified.

Besides, there is no knowledge of exactly which the misidentified cows are, and thus if the identification system notes that some error has occurred, i.e. due to the fact that only 19 identifications are made in a particular milking session the dairy farmer may want to omit the identification information of that session in order to be sure that all identifications actually recorded are correct. Thus, only 900 cows (1000−(5*20)), or 90%, will be certainly correctly identified. For larger parlors the correct identification probability will be even lower.

In U.S. Pat. No. 9,59,526 issued to Tucker the above-identified problem has been addressed and solved by means of an identification correction method which compares produced milk weight values and expected milk weight values in a given milking, and performs a correction by shifting at least one or more of the expected milk weight values relative to the produced milk weight values by at least one stall number, to provide accurate cow identification when there is a misidentified or unidentified cow, such as a cow having a missing identification tag.

SUMMARY OF THE INVENTION

It is an object of the present invention to address and solve the above-identified misidentification problem in a simple and effective manner and to thus provide an alternative to the solution disclosed in said U.S. Pat. No. 9,59,526.

The identification correction method proposed by Tucker has certain limitations. The produced milk weight has to be measured for each cow and compared with an expected milk weight value, derived from earlier milkings of the respective cow. Thus, the method needs a running-in period. Besides, the method relies on that the milk weight values are quite different from cow to cow and that the milk weight produced does not vary especially much from milking to milking.

Further, in a milking parlor of the kind described there may be a risk that a cow is identified, but does not enter the milking parlor. This risk is particularly high at the beginning and at the end of the filling of the parlor with cows, e.g. a cow may be identified before the first cow, which really enters the milking parlor, is identified, or a cow may be identified when the parlor is already full. In such an instance a situation may arise, where the number of identified cows in the stall are equal to the number of milk weights produced, but still the cows are misidentified. The prior art method by Tucker takes not this into account as it is triggered only by the fact that the number of identified cows in the stall are less than the number of milk weights produced.

Still further, the identification correction method by Tucker does not provide any means whatsoever for identifying the cow with an unidentified identification tag or for verifying/correcting the identity of the cows before milking actually takes place.

Thus, there is a further object of the invention to provide a solution that overcomes the limitations as identified using the identification correction method proposed by Tucker.

These objects among others are, according to the present invention, attained by methods and arrangements as claimed in the appended patent claims.

Further characteristics of the invention, and advantages thereof, will be evident from the following detailed description of preferred embodiments of the present invention given hereinafter and the accompanying FIGS. 1-5, which are given by way of illustration only, and shall thus not limit the scope of the present invention.

BRIEF DESCRIPTION OF THE DRAWINGS

Identical reference numerals are used throughout the Figures to denote identical or similar components, portions, details and the like of the various embodiments.

In the detailed description the milk producing animals are referred to as cows. However, the invention is not limited to cows, but is applicable to any animals having the capability to produce large quantities of milk, such as sheep, goats, buffaloes, horses, etc.

DETAILED DESCRIPTION OF EMBODIMENTS

Figure 1:
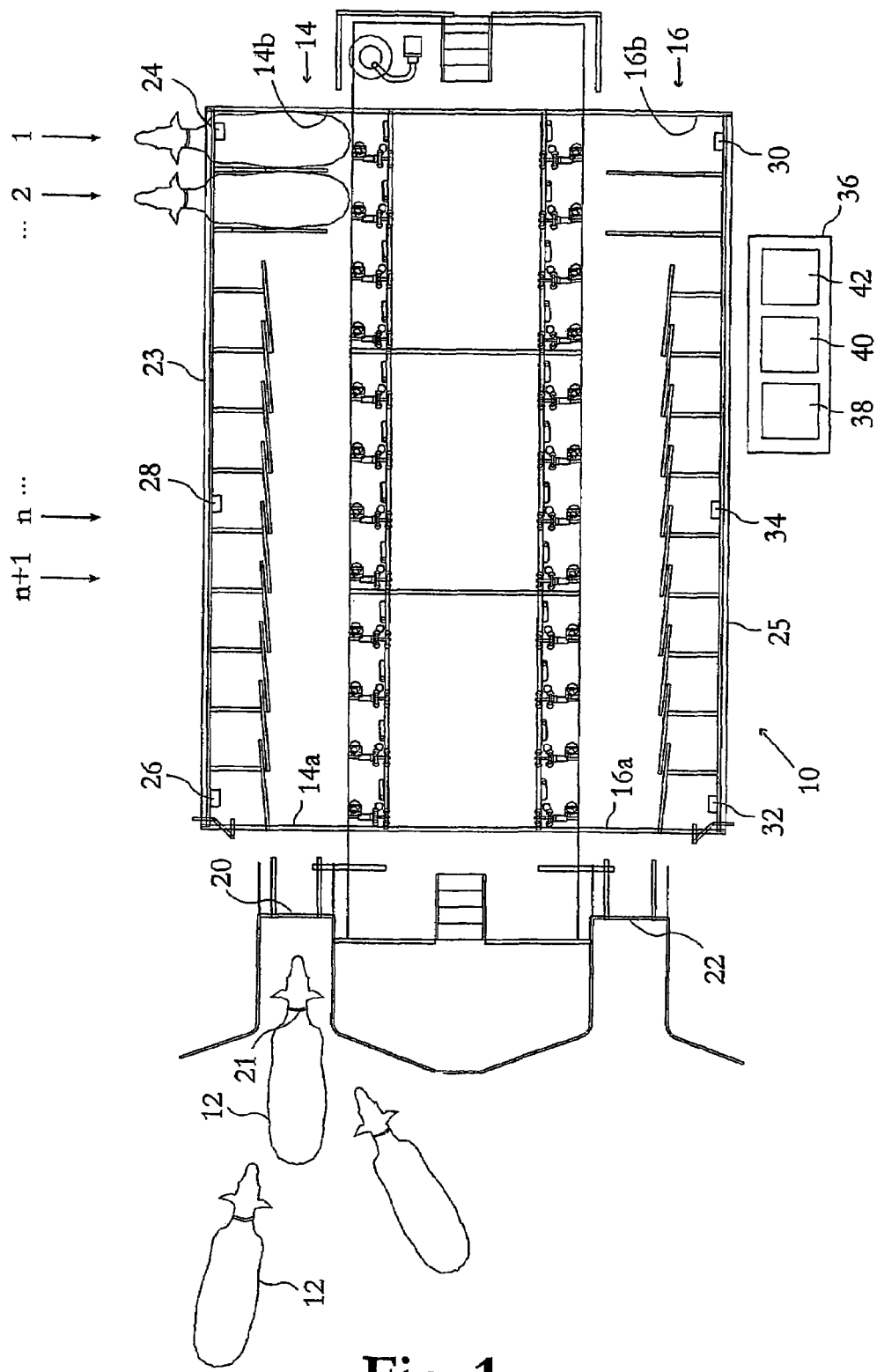
FIG. 1 is a schematic top plan view of a parallel stall milking parlor wherein a preferred embodiment of the present invention is implemented.

FIG. 1 shows a milking parlor 10 for milking a plurality of cows 12. A double parlor is shown, including a first row of parallel milking stalls 14, and a second row of parallel milking stalls 16, each of which including twelve stalls. Each of the rows 14, 16 is provided with a cow identification station 20, 22 in a respective front end thereof 14a, 16a, through which the cows 12 can pass serially while being identified.

A transponder 21 worn on a band around the neck of a cow 12 approaching any of the cow identification stations 20, 22 is energized by a multi-directional electromagnetic field generated by a double antenna loop (not explicitly illustrated) in a portal structure of that cow identification station 20, 22. The transponder, when energized, will transmit unique identification data back to the antenna loop after the electromagnetic field has been removed. A microprocessor 36, connected to the respective identification stations 20, 22, is provided to process the information so that the cow can be identified. For further details of the cow identification station reference is made to the above-identified U.S. Pat. No. 4,798,175, the content of which being hereby incorporated by reference. It shall particularly be appreciated that the transponder may be worn at other positions of the cow than on a band around the neck.

Alternatively, any other kind of cow identification system may be used in conjunction with the principles of the present invention. Reference is in this respect made to the above-identified U.S. Pat. No. 5,653,192 and U.S. Pat. No. 9,59, 526, and to U.S. Pat. No. 5,183,008 issued to Carrano and U.S. Pat. No. 5,028,918 issued to Giles et al., the contents of all of which being hereby incorporated by reference.

After the cows have passed serially through the identification station 20 (or 22) they enter sequentially the row of stalls 14 (or 16) arranged in parallel such that the first identified cow will enter the stall closest to the far end 14b (or 16b) of the row, i.e. the stall denoted 1 in FIG. 1, the second identified cow will enter the stall denoted 2, the n'th identified cow will enter the stall denoted n, and so on until the row is completely full with the last identified cow in the stall closest to the front end 14a (or 16a) of the row. The microprocessor 36 identifies the respective cow and stores the identities in chronological order in a buffer.

When cows have filled the row 14 (or 16) completely they are milked simultaneously. During the milking, measurements of the milk produced by the cows are performed, which typically at least include weights, volumes or flows of the milk produced by each cow. Such information is valuable in the management of the cows, e.g. for controlling their individual feed consumption and for monitoring their health. The milk weights are correlated with the cow identities and are stored by the microprocessor 36. Upon completion of milking, exit gate reels 23 (or 25) are rotated to permit the cows to exit from the milking parlor 10, or the cows may be permitted to leave the row of stalls 14 (or 16) from the far end 14b (or 16b) thereof.

According to the present invention an arrangement for automatically verifying identities of the cows in each of the rows of stalls 14, 16 is provided. The arrangement comprises for each row (i) a first identification member or antenna 24, 30 localized to the stall 1 in the far end 14b, 16b of the row for identifying the cow in that stall 1; (ii) a second identification member or antenna 26, 32 localized to the stall in the front end 14a, 16a of the row for identifying the cow in that stall; and (iii) a third identification member 28, 34 localized to a stall n between the far and front ends 14a, 14b, 16a, 16b of the row for identifying the cow in that stall n. 16. Preferably, the third identification member 28, 34 is localized to a stall located essentially half-way between the far and front ends of the row.

The microprocessor 36, being an integral portion of the verification arrangement, is connected by wire or wireless to each of the identification antennas 24, 26, 28, 30, 32 and 34 for identifying cows from the signals provided by the identification antennas 24, 26, 28, 30, 32 and 34. These identification antennas are similar to the antennas of the identifications stations 20 and 22 in operation, but may be designed smaller and simpler.

Further, the microprocessor 36 is provided with (i) a software module or software code 38 for comparing identifications of the identification antennas 24, 26, 28, 30, 32 and 34 with the identifications from the cow identification stations 20 and 22, (ii) a software module or software code 40 for verifying identities of at least some of the cows, and optionally (iii) a software module or software code 42 for correcting identities.

The operation of the verification arrangement will now be described with reference to the row 14 only. Each row of the milking parlor is handled separately by the verification arrangement.

When cows have filled the row 14 completely the arrangement identifies the cows in the first, n'th and last stall, as counted from the far end of the row 14b. The microprocessor 36 then compares, by means of the software code 38, the identifications of the first, second, and third identification antennas 24, 26, 28, respectively, with the first, last and n'th identifications, respectively, from the cow identification station 20. Finally, microprocessor 36 verifies, by means of the software code 40, depending on the comparison made, the identities of at least some of the cows in the row of stalls 14.

Preferably, the verification module 40 verifies the identities of the cows in the stalls located between the far end 14b of the row of stalls 14 and the stall n (with the stall n included) if the identifications of the first and third identification antennas 24, 28 match with the first and n'th identifications from the cow identification station 20 as found by the comparison module 38. Similarly, the verification module 40 verifies the identities of the cows in the stalls located between the stall n (with the stall n included) and the front end 14a of the row of stalls 14 if the identifications of the second and third identification antennas 26, 28 match with the last and n'th identifications from the cow identification station 20.

Such arrangement provides in general for a lower number of misidentified cows since when the identification error occurs among the latter cows at least the cows in stalls 1-n may be identified and verified.

Further, such arrangement provides for the detection of errors even if the number of identifications from the identification station coincides with the number of measured milk weights, i.e. with the number of cows actually being milked. For instance, one cow may have entered the row of stalls without being identified and another cow not entering the row of stalls may have been erroneously identified in vicinity of the identification station 20. If both errors occur after the first n cows having entered the identifications of cows in the stalls 1-n may still be verified.

Thus, the present invention not only provides for a larger degree of identified cows, but also prevents misidentified cows from being verified. As only milk weights will be correlated with verified cow identities there is no risk that a milk weight correlated with a misidentified cow will mislead the dairy farmer when feeding or treating that cow.

Further, the arrangement may be adapted to correct/verify the identities of the cows before the milk weights have been measured, e.g. in connection with the identifications made by the respective identification antennas 24, 26 and 28. In some situations there is important to know the correct identities of the cows before the milking is performed. For example, the milk from cows that are under treatment must not be stored with the milk from healthy cows.

Still further, the invention provides for a certain degree of correction of erroneously made identifications. Several different cases arise depending on the kind of error occurred and where in the sequence the error is made.

Suppose that an unidentified cow (i.e. a cow not identified by the identification station 20) has entered any of the stalls 1-n, firstly it is noted that only eleven identifications from the identification station 20, while milk weights will be measured for twelve cows, i.e. for all stalls in the row. Further, the comparison module 38 will note that the identification of the third identification antenna 28 differs from the n'th identification from the cow identification station 20.

Then the comparison module 38 compares the identifications of the second and third identification antennas 26, 28 with the last and (n−1)'th identifications from the cow identification station 20 and if the identifications of the second and third identification antennas 26, 28 match with the last and (n−1)'th identifications from the cow identification station 20, the correction module 42 corrects the identities of the cows in the stalls located between the stall n (with the stall n included) and the front end 14a of the row of stalls 14 by using the (n−1)'th to last identifications from the cow identification station 20 as the identities of the cows in the stalls located from the stall n to the stall located in the front end of the row of stalls, and finally the verification module 40 verifies the corrected identities only.

A special case arises when the first cow entering the row of cows 14 is not properly identified by the identification station 20 and when it can be established that the number of identifications from the identification station 20 is one less than the number of stalls. In this case the comparison module 40 will find no match at all, and compares instead the identifications of the second and third identification antennas 26, 28 with the last and (n−1)'th identifications from the cow identification station 20 and if the identifications of the second and third identification antennas 26, 28 match with the last and (n−1)'th identifications from the cow identification station 20, the correction module 42 corrects the identities of the cows in the row of stalls 14 by using (i) the identification from the identification antenna 24 as the identity of the cow in the stall 1, and (ii) the first to last identifications from the cow identification station 20 as the identities of the cows in the stall 2 to the stall located in the front end 14a of the row of stalls 14. Finally, the verification module 40 verifies the corrected identities.

Another case arises if the first cow identified by aid of the identification station 20 does not actually enter the row of stalls 14. Then the eleven last indications of the twelve identifications from the identification station 20 will actually correctly identify the cows in the stalls 1-11 as counted from the far end 14a of the row of stalls. The modules 38, 40, and 42 of the microprocessor 36 may be adapted to correct and verify the identities accordingly. It will be detected that the identifications of the first and third identification members 24, 28, respectively, match with the second and (n+1)'th identifications, respectively, from the animal identification station 20. If the arrangement provides for recording of thirteen identifications from the identification station 20 actually the identities of all twelve cows in the row of stalls may be correctly identified.

In whatever situation the identifications from the identification antennas 24, 26, 28 may be used as the identities of the cows in the 1'st, n'th and the stall closest to the front end 14a of the row of stalls 14 by the correction module 40.

Figure 2:
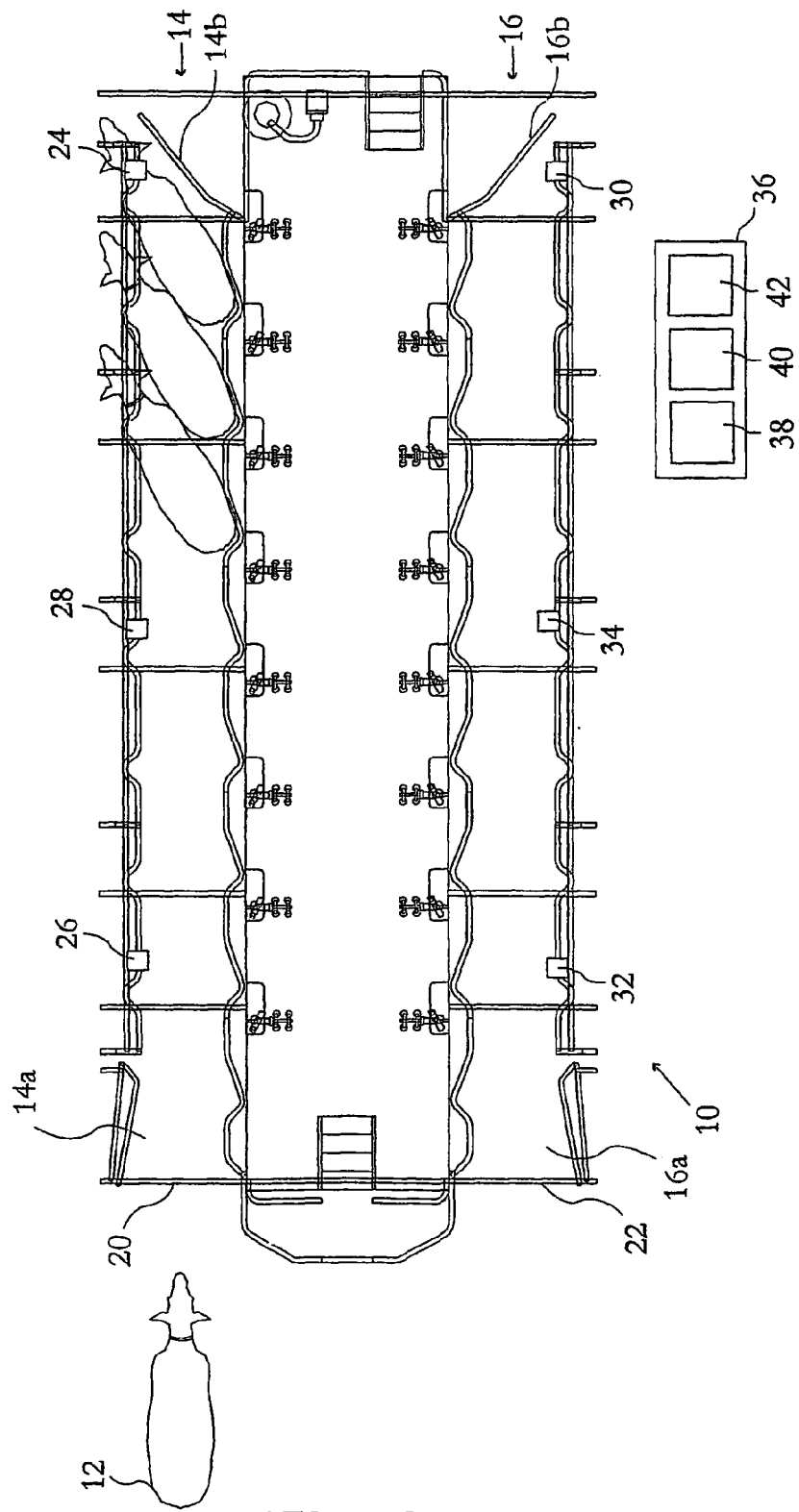
FIG. 2 is a schematic top plan view of a milking parlor in a herringbone configuration wherein another preferred embodiment of the invention is implemented.
Figure 3:
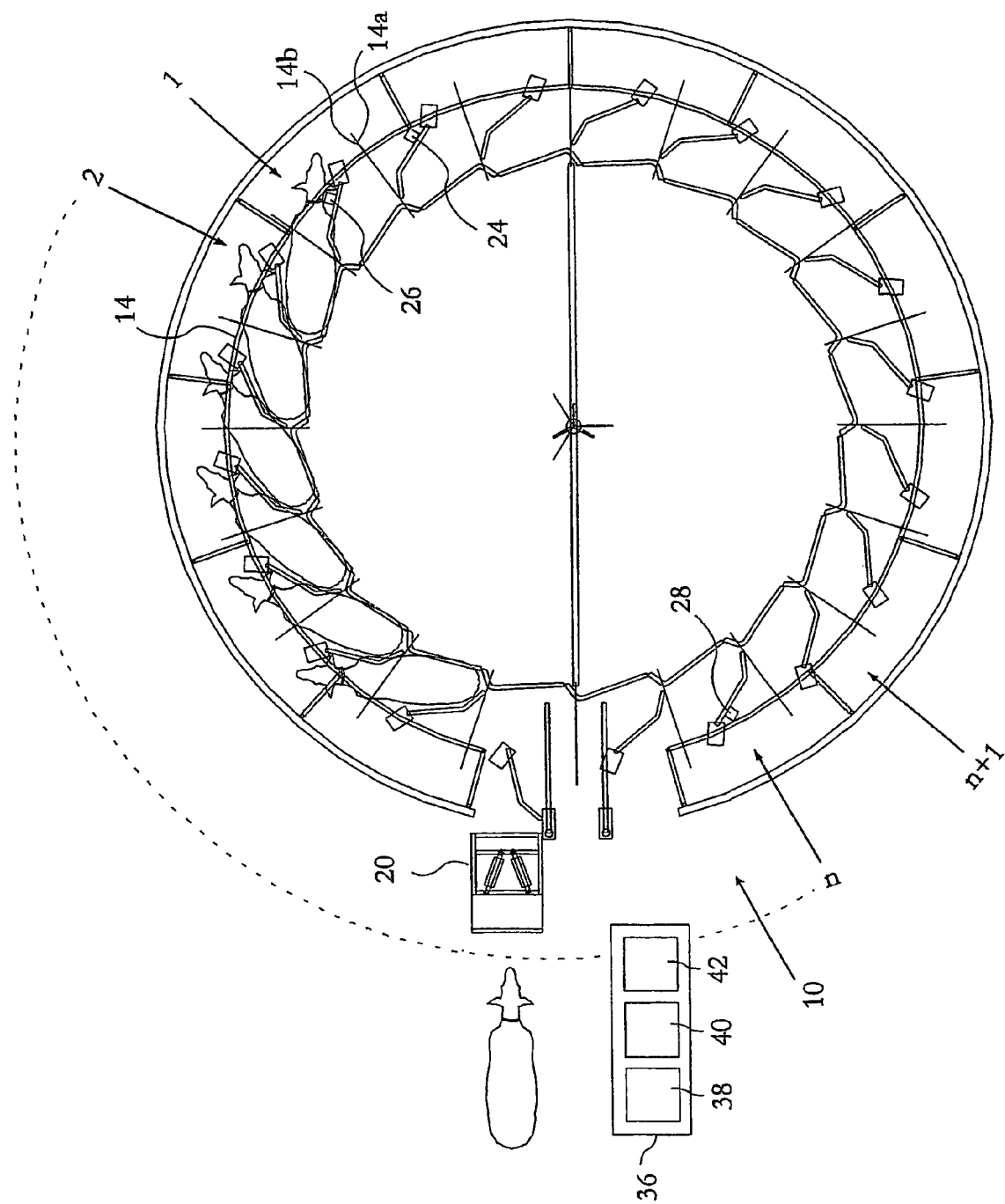
FIG. 3 is a schematic top plan view of a milking parlor in a rotary configuration wherein yet another preferred embodiment of the invention is implemented.

FIGS. 2 and 3 illustrate two alternative embodiments of the present invention, which are similar to the arrangement of FIG. 1, but are implemented in other kind of milking parlors.

FIG. 2 illustrates an inventive arrangement implemented in a milking parlor in herringbone configuration. The parlor is comprised of two rows of stalls, each including eight stalls.

FIG. 3 illustrates an inventive arrangement implemented in a milking parlor in a rotary configuration. The parlor is comprised of a rotatable circular row of twenty stalls. Here, the cows might be milked in a unbroken manner, and not group wise, but the invention may be implemented by defining virtual front and back ends 14a, 14b and by performing the identification, comparison, optionally correction, and verification for each revolution of the rotary parlor.

Figure 4:
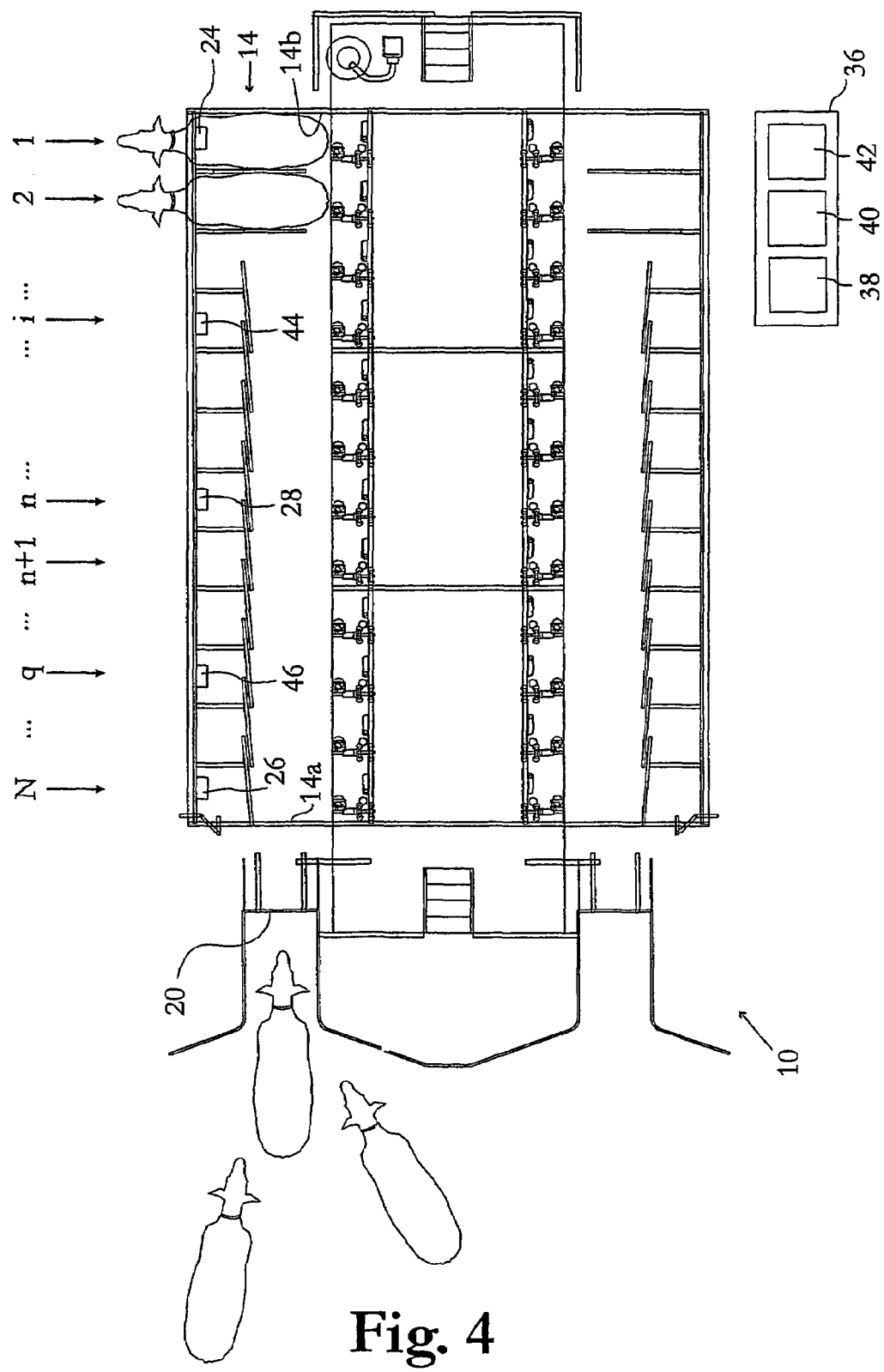
FIG. 4 is a schematic top plan view of a parallel stall milking parlor wherein still another preferred embodiment of the present invention is implemented.

Next, with reference to FIG. 4, which is a schematic top plan view of a parallel stall milking parlor, still another preferred embodiment of the present invention will be described.

This embodiment is similar to the embodiment of FIG. 1, but includes for the row 14 a fourth identification antenna 44 localized to a stall i between the stall 1 and the stall n, preferably essentially half-way between, and a fifth identification antenna 46 localized to a stall q between the stall n and the stall closest to the front end of the row, preferably essentially half-way between.

The comparison module 38 of the microprocessor 36 compares now not only the identifications of the first, second and third identification antennas 24, 26 and 28 with the first, last and n'th identifications from the identification station 20, but compares also the identifications of the fourth and fifth identification antennas 44 and 46 with the i'th and q'th identifications from the identification station 20; and the verification module 40 verifies, depending on the comparison of the five identifications, the identities of at least some of the cows in the row of stalls.

The operation of the different modules 38, 40, 42 may be modified to compare, optionally correct, and verify in a similar manner as described with reference to FIG. 1 but with use of five identification antennas instead of three.

The more identification antennas used the more accurate verification is obtained, and the larger number of correctly identified cows are obtained, but of course to the cost of more expensive equipment and more signaling/computing, which in turn puts higher requirements on the processing capacity of the microprocessor 36. The present inventor has found that for a row of N stalls, where N is at least six, the inventive arrangement should preferably comprise between three and N/2 identification antennas essentially evenly distributed among the stalls in the row of stalls.

Finally, with reference to FIG. 5, which is a schematic top plan view of a milking parlor in rotary configuration, still another preferred embodiment of the present invention will be described.

This embodiment differs from the arrangement illustrated in FIG. 3 in that the first, second, and third identification members 24, 26, 28 are here comprised of a single identification member 24, 26, 28 arranged in a non-rotatable manner, preferably anywhere outside the rotatable circular row of stalls.

The arrangement is adapted to identify the cows in the stalls located at the far end 14b, at the front end 14a, and between the far and front ends 14a, 14b (i.e. the n'th one) of said row of stalls 14 sequentially as the stalls pass by the single identification member 24, 26, 28 during the rotation of the row of stalls 14 while milking the cows therein.

Figure 5:
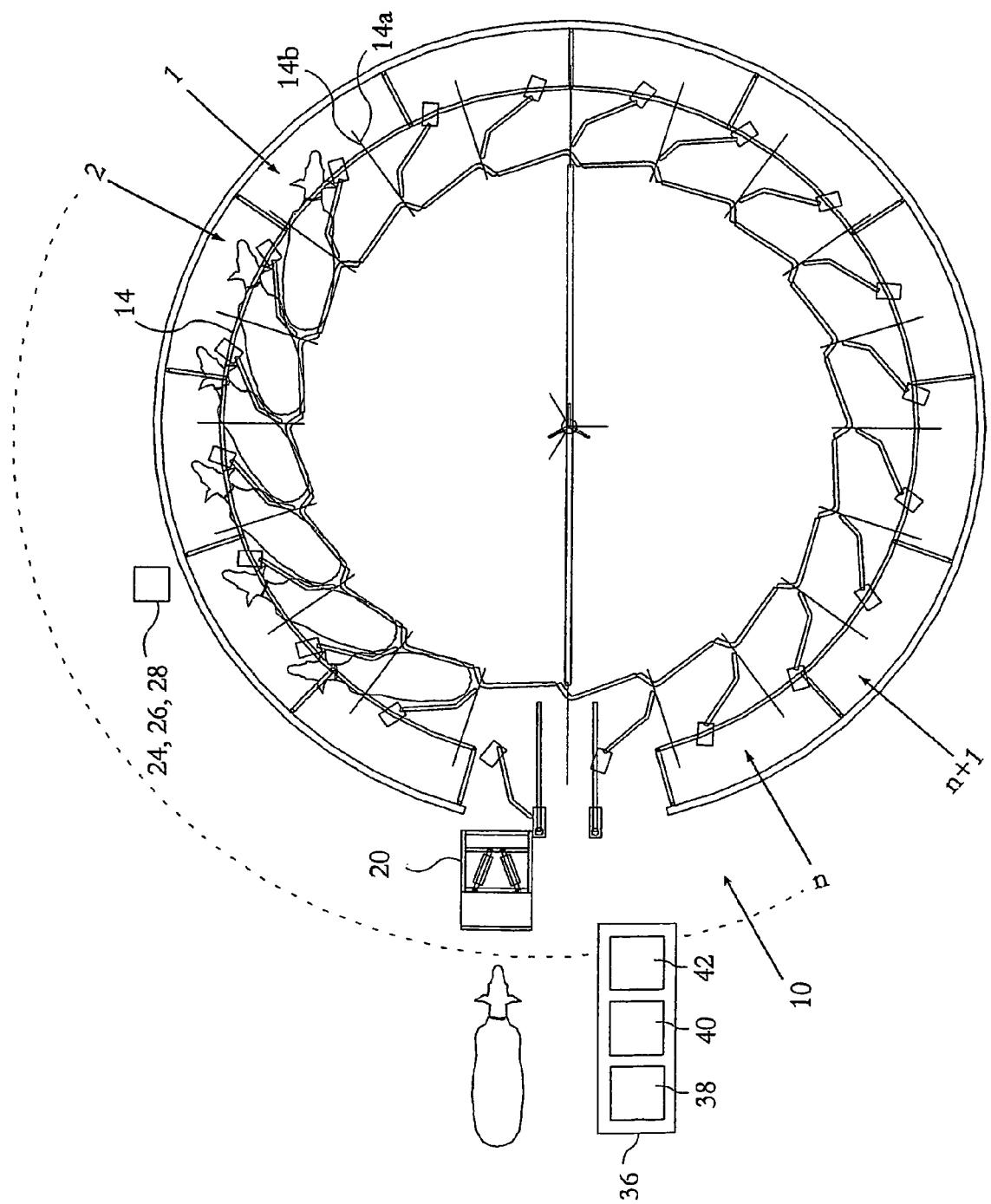
FIG. 5 is a schematic top plan view of a milking parlor in a rotary configuration wherein yet another preferred embodiment of the invention is implemented.

In fact, the arrangement of FIG. 5 may easily be adapted to identify cows in every fourth, every second, or even in each single stall by modifying the software modules 38, 40 and 42 of the microprocessor 36.

It will be obvious that the invention may be varied in a plurality of ways within the scope of the appended patent claims.

The invention claimed is:

1. In a milking parlor (10) adapted for milking milk producing animals comprising:

a row of milking stalls (14) accessible in serial order to said milk producing animals (12) from a front end (14a) of the row of milking stalls; and
an animal identification station (20) arranged at the front end of said row of milking stalls,
a method of automatically verifying identities of said milk producing animals (12) in said row of stalls (14) comprising the steps of:
identifying said milk producing animals when entering said row of milking stalls (14) in serial order by means of said animal identification station;
identifying a first one of the milk producing animals in the milking stall located at a far end (14b) of said row of milking stalls by means of a first identification member (24) provided in said milking stall located at the far end (14b) of said row of milking stalls;
identifying a second one of the milk producing animals in the milking stall located at said front end (14a) of said row of milking stalls (14) by means of a second identification member (26) provided in said milking stall located at the front end (14a) of said row of milking stalls;
identifying a third one of the milk producing animals in a milking stall located between said far and front ends of said row of milking stalls by means of a third identification member (28) provided in said milking stall located between said far and front ends of said row of milking stalls;
comparing the identities of the first, second, and third identification members (24, 26, 28), respectively, with the first, last and n'th identities, respectively, of said animal identification station (20), and when counting from said far end of said row of milking stalls, said milking stall located between said far and front ends of said row of milking stalls is defined as the n'th milking stall; and
depending on said comparison, verifying the identities of at least some of said milk producing animals in said row of milking stalls,
wherein
the identities of the milk producing animals in the milking stalls located between said far end and said milking stall located between said far and front ends of said row of milking stalls are verified provided that the identities of the first and third identification members (24, 28), respectively, match with the first and n'th identities, respectively, from said animal identification station; and
the identities of the milk producing animals in the milking stalls located between said milking stall located between said far and front ends and said front end of said row of milking stalls are verified provided that the identities of the second and third (26, 28) identification members, respectively, match with the last and n'th identities, respectively, from said animal identification station.

2. The method of claim 1 wherein the steps of
comparing the identities of the second and third identification members (26, 28), respectively, with the last and (n−1)'th identities, respectively, from said animal identification station; and
if the identities of the second and third identification members, respectively, match with the last and (n−1)'th identities, respectively, from said animal identification station correcting the identities of the milk producing animals in the milking stalls located between said milking stall located between said far and front ends and said front end of said row of milking stalls by using the (n−1)'th to last identities from said animal identification station as the identities of the milk producing animals in the stalls located from said milking stall located between said far and front ends to the milking stall located at said front end of said row of milking stalls; and verifying the corrected identities only are performed provided that the identification of the first identification member (24) matches with the first identification from said animal identification station and that the identification of the third identification member (28) differs from the n'th identification from said animal identification station.

3. The method of claim 1 wherein the steps of comparing the identities of the first, second, and third identification members (24, 26, 28), respectively, with the second, last and (n−1)'th identities, respectively, from said animal identification station; and if the identities of the second and third identification members (26, 28), respectively, match with the last and (n−1)'th identities, respectively, from said animal identification station correcting the identities of the milk producing animals in said row of milking stalls by using the first to last identities from said animal identification station as the identities of the milk producing animals in the second to last milking stall of said row of milking stalls, as counted from the far end of said row of milking stalls, and by using the identification of the first identification member (24) as the identity of the milk producing animal in the milking stall at the far end (14a) of said row of milking stalls (14); and verifying the corrected identities are performed provided that the identities of the first, second, and third identification members (24, 26, 28), respectively, differ from the first, last and n'th identities, respectively, from said animal identification station.

4. The method as claimed in claim 1 wherein the milking stall located between said far and front ends (14a, 14b) of said row of milking stalls (14) is a milking stall located essentially half-way between said far and front ends of said row of milking stalls.

5. The method as claimed in claim 1 comprising the steps of:

identifying the third milk producing animal in a milking stall located between said far end (14a) and said station located between said far and front ends (14a, 14b) of said row of stalls (14) by means of a fourth identification member (44) provided in that milking stall;

comparing the identification of the fourth identification member (44) with the i'th identification from said animal identification station, where said milking stall located between said far end and said stall located between said far and front ends of said row of milking stalls is the i'th milking stall as counted from said far end of said row of milking stalls; and depending on said comparison of the identification of the fourth identification member with the i'th identification from said animal identification station verifying the identities of at least some of said milk producing animals in said row of milking stalls.

6. The method as claimed in claim 5 comprising the steps of:

identifying the milk producing animal in a milking stall located between said station located between said far and front ends (14a, 14b) and said front end (14a) of said row of milking stalls (14) by means of a fifth identification member (46) provided in that milking stall;

comparing the identification of the fifth identification member (46) with the q'th identification from said animal identification station (20), where said milking stall located between said milking stall located between said far and front ends and said front end of said row of milking stalls is the q'th milking stall as counted from said far end of said row of milking stalls; and depending on said comparison of the identification of the fifth identification member with the q'th identification from said animal identification station verifying the identities of at least some of said milk producing animals in said row of milking stalls.

7. The method as claimed in claim 1 wherein said row of milking stalls (14) includes at least twelve milking stalls and wherein said method further comprises the steps of:

identifying the milk producing animals at least in every fourth milking stall located between said far and front ends of said row of milking stalls by means of a respective identification member (24, 26, 28, 44, 46) provided in said at least every fourth milking stall;

comparing the identities of said respective identification member (24, 26, 28, 44, 46) provided in said at least every fourth milking stall, with respective corresponding identification from said animal identification station (20); and depending on said comparison of the identities of said respective identification member (24, 26, 28, 44, 46) provided in said at least every fourth milking stall, with respective corresponding identification from said animal identification station (20), verifying the identities of at least some of said milk producing animals in said row of milking stalls.

8. The method as claimed in claim 1 wherein measurements of the milk produced by said milk producing animals in said row of milking stalls are performed; and of said measurements only measurements of the milk produced by milk producing animals with verified identities are utilized in the management of said milk producing animals.

9. The method as claimed in claims 8 wherein said measurements are weights, volumes or flows of the milk produced by said milk producing animals.

10. The method as claimed in claim 1 wherein said milking parlor (10) is a milking parlor in any of a herringbone, a rotary, or a parallel milking stall configuration.

11. The method as claimed in claim 1 wherein said method is performed by means of a computer (36).

12. In a milking parlor (10) adapted for milking milk producing animals, comprising:

a row of milking stalls (14) accessible in serial order to a plurality of milk producing animals (12) from a front end (14a) of the row of milking stalls; and an animal identification station (20) arranged in the front end of said row of milking stalls for identifying said milk producing animals (20) when passing serially there through to enter said row of milking stalls (14), the milking parlor (10) adapted to automatically verify identities of said milk producing animals in said row of milking stalls, and further comprising:

a first identification member (24) for identifying the milk producing animal in the milking stall located at a far end (14b) of said row of milking stalls (14);

a second identification member (26) for identifying the milk producing animal in the milking stall located at said front end (14*a*) of said row of milking stalls (14);

a third identification member (28) for identifying the milk producing animal in a milking stall located between said far and front ends (14*a*, 14*b*) of said row of milking stalls (14);

a comparator (38) for comparing the identities of the first, second, and third identification members (24, 26, 28), respectively, with the first, last and n'th identities, respectively, from said animal identification station (20), and when counting from said far end of said row of milking stalls, said milking stall located between said far and front ends of said row of milking stalls is defined as the n'th milking stall; and a verifier (40) for, depending on said comparison, verifying the identities of at least some of said milk producing animals in said row of milking stalls.

13. The arrangement of claim 12 wherein said verifier (40) is adapted to verify the identities of the milk producing animals in the milking stalls located between said far end (14*b*) and said milking stall located between said far and front ends (14*a*, 14*b*) of said row of milking stalls (14) if the identities of the first and third identification members (24, 28), respectively, match with the first and n'th identities, respectively, from said animal identification station (20); and to verify the identities of the milk producing animals in the milking stalls located between said stall located between said far and front ends (14*a*, 14*b*) and said front end (14*a*) of said row of milking stalls (14) if the identities of the second and third identification members (26, 28), respectively, match with the last and n'th identities, respectively, from said animal identification station (20).

14. The arrangement of claim 12 further comprising means (42) for correcting identities, wherein said comparator (38) is adapted to compare the identities of the second and third identification members (26, 28), respectively, with the last and (n−1)'th identities, respectively, from said animal identification station (20) if the identification of the third identification member (28) differs from the n'th identification from said animal identification station (20);

said means (42) for correcting identities is adapted to correct the identities of the milk producing animals in the milking stalls located between said milking stall located between said far and front ends (14*a*, 14*b*) and said front end (14*a*) of said row of milking stalls (14) by using the (n−1)'th to last identities from said animal identification station (20) as the identities of the milk producing animals in the milking stalls located from said milking stall located between said far and front ends to the milking stall located at said front end of said row of milking stalls if the identities of the second and third identification members (26, 28), respectively, match with the last and (n−1)'th identities, respectively, from said animal identification station (20); and said verifier (40) is adapted to verify the corrected identities only.

15. The arrangement as claimed in claim 12 wherein said third identification member (28) is provided in a milking stall located essentially half-way between said far and front ends of said row of milking stalls.

16. The arrangement as claimed in claim 12 wherein said arrangement comprises a plurality of identification members (24, 26, 28, 44, 46), each provided in a respective milking stall located between said far and front ends (14*a*, 14*b*) of said row of milking stalls (14) for identifying the milk producing animal therein;

said comparator (38) is adapted to compare the identities of each of said plurality of identification members (24, 26, 28, 44, 46) with corresponding identities from said animal identification station (20); and said verifier (40) is adapted to, depending on said comparison, verify the identities of at least some of said milk producing animals in said row of milking stalls.

17. The arrangement as claimed in claim 12 wherein said milking parlor (10) is a milking parlor in any of a herringbone, a rotary, or a parallel milking stall configuration.

18. The arrangement in claim 17 wherein said milking parlor is a rotary milking parlor comprising a rotatable circular row of milking stalls; and said first, second, and third identification members (24, 26, 28) are comprised of a single identification device (24, 26, 28), preferably arranged outside the rotatable circular row of milking stalls, and adapted to identify the milk producing animals in said milking stalls located at said far end (14*b*), at said front end (14*a*), and between said far and front ends (14*a*, 14*b*) of said row of milking stalls (14) as they pass by said single identification device.

19. The arrangement as claimed in claim 12 wherein said row of milking stalls (14) includes N stalls, where N is at least six, and said arrangement further comprises between three and N/2 identification members (24, 26, 28; 24, 26, 28, 44, 46) essentially evenly distributed among the milking stalls in said row (14) of milking stalls, wherein said comparator (38) is adapted to compare the identities of the identification members (24, 26, 28; 24, 26, 28, 44, 46) with corresponding identities from said animal identification station (20); and said verifier (40) is adapted to verify the identities of milk producing animals in milking stalls located between two adjacent identification members (44, 28) provided that the identities of said two adjacent identification members (44, 28) match with corresponding identities from said animal identification station (20).

* * * * *